Dec. 21, 1954  W. MARGRAVE  2,697,620
REMOVABLE HOSE COUPLING
Filed June 14, 1950

INVENTOR.
WILTON MARGRAVE
BY John N. Wolfram
Agent

United States Patent Office 2,697,620
Patented Dec. 21, 1954

2,697,620

REMOVABLE HOSE COUPLING

Wilton Margrave, South Euclid, Ohio, assignor to The Parker Appliance Company, Cleveland, Ohio, a corporation of Ohio Application June 14, 1950, Serial No. 168,105

1 Claim. (Cl. 285—86)

This invention relates to hose couplings and particularly to a reuseable type coupling for rubber hose having a braided wire reinforcement embedded between inner and outer layers of rubber. The invention contemplates the stripping of the outer layer of rubber from the portion of the hose end to be coupled so that the coupling may directly engage the outer surface of the braided wire.

Rubber hose having braided wire reinforcement is intended for high pressure installations and is capable of withstanding internal fluid pressures of many thousands of pounds pressure per square inch. For example, a hose of 1/4" inside diameter may have a burst strength of 18,000 p. s. i. and may be used for working pressures as high as 4000 to 5000 p. s. i.

In order to effectively couple hoses of this type it is necessary that at least one coupling element establish sealing contact with the inner layer of rubber and that the elements also obtain a tight grip upon the wire braid to prevent the hose from pulling out of the coupling when internal fluid pressures are applied. In order to provide a coupling design which is relatively simple and inexpensive it is desirable that both of these functions be simultaneously obtained by simply compressing the hose end between a nipple and socket. However, due to the high fluid pressures encountered, it is difficult to compress the hose end enough to obtain sufficient grip upon the wire braid without cutting or otherwise damaging the inner layer of rubber so as to prevent the obtaining of a seal, or without so compressing the rubber that it will be subject to cold flow which will cause leakage after a short period of time. When rubber is compressed to seal against the action of fluid pressure it must be done in such a way that cold flow will be minimized, as otherwise the rubber will gradually flow away from the area of high compression toward areas of no or relatively less compression. When this occurs there is less chance that enough compression is retained in the sealing area to prevent leakage after a period of time.

To facilitate the obtaining of a tight grip upon the wire braid, the outer layer of rubber is stripped off the end of the hose so that the socket may directly engage the braid. But in addition it has been found necessary to shape and relate the clamping surfaces of the socket and nipple in a particular manner in order to provide satisfactory sealing and gripping characteristics for the high fluid pressure involved.

In view of the above it is an object of the present invention to provide a coupling for high pressure wire braid reinforced rubber hose which is simple in design and of a minimum number of parts and which will provide maximum effectiveness against pull-out of the hose and leakage of the joint due to high fluid pressures within the hose.

It is another object to provide a coupling for high pressure hose having a braided wire enforcement embedded between inner and outer layers of rubber, but with the portion of the hose to be coupled having the outer layer of rubber stripped off so as to bare the wire braid, wherein the coupling parts grip the hose with a high unit stress over a substantial length of the stripped portion.

It is another object to provide a reusable coupling for stripped wire braid rubber hose of the type described in which the stripped end of the hose is initially gripped with a high unit clamping pressure which is a maximum at approximately the midpoint of the length of the clamping surfaces and which decreases gradually in both directions therefrom whereby cold flow of rubber from the region of maximum clamping pressure to regions of relatively low clamping pressures will be avoided.

It is another object to provide a reusable coupling for stripped wire braided hose comprising a socket and nipple in which the socket has a clamping surface providing teeth for engaging the stripped wire braid at a distance from the end of the hose and wherein the effective clamping surface is smooth adjacent the end of the hose so as to avoid unnecessary unraveling of the wire braid due to rotation of the hose within the socket when the nipple is being inserted.

Another object is to provide a reusable coupling for stripped wire braided rubber hose comprising a nipple having a relatively long tapered clamping surface insertable within the hose, and a socket having a clamping surface opposed to the tapered clamping surface of the nipple and engageable with the stripped wire braid, the clamping surface of the socket being formed on a relatively long radius and so disposed that it will lie closest to the tapered clamping surface of the nipple at approximately the midpoint of the latter and gradually recede therefrom substantially uniformly in both directions from this midpoint.

Another object is to provide a hose coupling of the type described in which the inner and greater portion of the socket clamping surface is formed on a relatively long radius to provide an extended clamping area with only slight and gradual change in clamping pressure and in which the outer and smaller part of the socket clamping surface is formed on a relatively short radius and flares rapidly outwardly to a diameter approximately that of the unstripped part of the hose whereby an encompassing of the unstripped portion and a maximum length of grip on the stripped portion is obtained with a minimum length of socket.

Another object is to provide a reusable hose coupling for the stripped end of a wire braided hose in which a substantial portion of the stripped hose end is clamped between smooth surfaces of the coupling and another portion is clamped between coupling surfaces at least one of which is serrated or grooved to provide a series of gripping edges which may be embedded in the hose end.

Another object is to provide a reusable coupling for the stripped end of a wire braided hose in which the stripped hose end is clamped between a nipple and socket with a maximum compression at approximately the midpoint of the clamped portion and in which the socket has gripping ribs of maximum depth at a point outwardly of the stated midpoint and gradually diminishing in depth so as to merge into a smooth surface either at or slightly inward of the midpoint, the maximum depth of the gripping ribs being approximately equal to the thickness of the wire braid.

Other objects will be apparent from a more detailed description and from the drawings in which.

Figure 1:
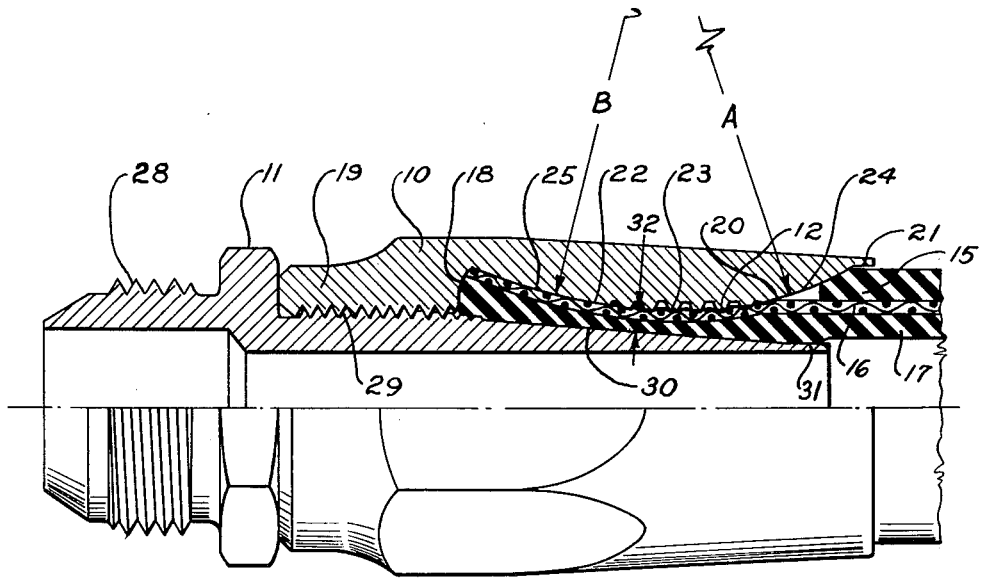
Figure 1 is a longitudinal view, partly in section, through the coupling with the parts in the fully asssembled position.
Figure 2:
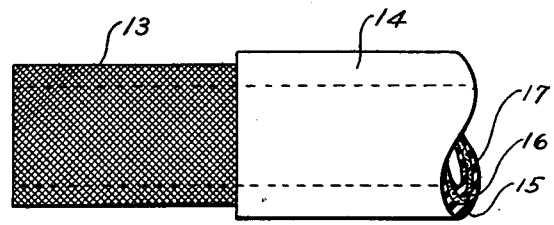
Figure 2 is an external view of a portion of a high pressure, wire braid reinforced rubber hose with a portion of the outer layer of rubber stripped off so as to bare the wire braid preparatory to clamping the hose end within the coupling.

In the form of the invention as illustrated, the coupling is composed of two parts, namely a socket 10 and a nipple 11. The socket has a hose receiving chamber 12 for receiving the end 13 and a hose 14 from which the outer layer of rubber 15 has been stripped so as to expose the wire reinforcing braid 16 but in which the inner layer of rubber 17 has been left intact. The chamber terminates in a transverse abutment wall 18 and has a threaded extension 19 by means of which it may be attached to the nipple 11.

The wall of the hose receiving chamber 12 has a reduced diameter between its ends approximating that to the stripped portion 13 of the hose. The outer portion 20 of this wall is flared radially outwardly from the reduced diameter to a larger diameter near the outer end of the socket and intersects a short cylindrical counterbore 21 which is of a diameter to receive the unstripped portion of the hose. Flaring of the outer portion 20 is accomplished with a relatively short radius A and the curved surface so formed is so disposed as to have a relatively high average slope with respect to the longitudinal axis of the coupling. It thus provides a rapid transition for the hose receiving chamber 12 from a diameter approximately that of the stripped portion 13 of the hose to the larger diameter of the unstripped portion. The inner end of this curved outer portion 20 joins an inner curved portion 22 of the chamber 12 which is formed on a relatively large radius B. This inner curved portion 22 flares outwardly from the reduced diameter to a larger diameter at the inner end of the chamber. The average slope with respect to the longitudinal axis of the coupling is materially less and in an opposite direction than that of the curved outer surface 20.

Intermediate the opposite ends of the two curved surfaces 20 and 22 there is formed a series of gripping ribs 23 which are of a maximum depth near the midsection of the ribbed area and which are of gradually decreasing depth at the opposite extremities of this area so as to gradually merge into smooth surfaces 24 and 25 which form the opposite ends of the curved surfaces 20 and 22. The ribs 23 may be either annular or spiral.

The nipple 11 is formed with any suitable means 28 at its outer end for connection to a machine element or other part to which the hose assembly is to be attached. The inner end of the nipple includes a threaded section 29 for threading the nipple into the socket. Inwardly of the threaded section there is a smooth tapered clamping surface 30 which terminates in a relatively short cylindrical section 31.

In the assembled position of the coupling the smooth tapered clamping surface 30 of the nipple lies opposite substantially all of the inner curved surface 22 of the socket and opposite at least a portion of the outer curved surface 20. The slope of the tapered surface 30 is uniform and so disposed relative to the wall of the hose receiving chamber 12 that in the assembled position it will lie closest to the wall of the chamber at substantially the midpoint of the smooth tapered portion 30 as indicated at 32. The hose end will thus be clamped with the greatest amount of compression in the region of the point 32. The nipple taper 30 and the wall of the hose receiving chamber 12 are furthermore so shaped and disposed relative to each other that in the final position of the parts the space therebetween will increase gradually on either side of the point 32. In this regard it will be noted that the point 32 is between the ends of the inner curved surface 22. This gradual increase is continued to both ends of the clamping area for the stripped portion of the hose. Thus compression of the hose is greatest at approximately the midpoint of the clamping area and is continued with only a small and gradual decrease towards the extremities of the clamping area whereby a relatively large area of the hose end is subjected to high clamping stress with no sudden decrease in the clamping stress. Since there is no area of relatively low clamping stress closely adjacent the region of highest clamping stress 32, cold flow of rubber with consequent decrease in clamping stress at this region is minimized.

The ribs 23 in the socket provide a series of gripping edges which extend over a substantial part of the bared wire braid for securely retaining the hose end within the coupling. These ribs are preferably formed with a maximum depth substantially equal to the thickness of the wire braid so that at no time can the ribs be embedded to a depth which would cause an excessive crimp or convolution in the braid and result in the cutting through or severing of the inner layer of rubber. Furthermore the depth of the ribs is gradually decreased so that they merge into the smooth portion 25 of the socket chamber wall at a point inward of the point of maximum compression 32. This provides gripping ribs at the point of maximum compression but their depth is reduced to provide a further safeguard against severance of the inner layer of rubber where the rubber is squeezed the thinnest.

Termination of the ribs 23 at or near the midpoint of the clamping area 32 also results in a substantial portion of the hose end being clamped between the smooth inner end of the curved surface 22 and the smooth nipple taper 30. This has the advantage of preventing unraveling of the braided wire reinforcement in the event that the hose turns within the socket during assembly, as would otherwise occur if the gripping ribs were continued to the inner end of the hose receiving chamber 12.

As hereinbefore mentioned, the coupling provides a relatively long gripping area upon the stripped portion of the hose end so as to provide high resistance to pull-out. The clamping surface of the socket across this area is of reduced diameter approximately that of the wire braid. It is desirable that the end of the unstripped portion be contained within the socket and subjected to at least a small amount of compression so as to prevent the access of moisture and other external substances to the stripped portion. In order to receive the unstripped portion, the diameter of the hose receiving chamber 12 is rapidly increased by means of the curved surface 20 of relatively large average slope so that the total overall length of the hose receiving chamber and hence of the socket may be kept to a minimum.

I claim:

A coupling for a hose having inner and outer layers of rubber-like material with a reinforcing material therebetween and in which the outer layer has been stripped off at the end to be coupled, comprising a socket member having a bore therethrough, one end of said bore being threaded and the other end constituting a chamber for receiving the stripped end of the hose, a nipple threaded into said threaded end and having an outer smooth tapered portion converging away from the threaded portion and extending into said chamber from a point adjacent the inner end of said chamber to a point adjacent the outer end thereof for clamping the hose end against the wall of the chamber, the outer portion of the wall being initially and permanently convexly curved upon a relatively short radius from a smaller diameter at a point intermediate the ends of the chamber to a larger diameter toward the outer end of the chamber, the inner portion of said wall being initially and permanently convexly curved upon a relatively long radius from a smaller diameter at a point intermediate the ends of the chamber to larger diameter toward the inner end of the chamber, said curves meeting at a common point of tangency opposite the smooth tapered portion of the nipple and spaced therefrom and on a diameter substantially corresponding to that of the stripped end of the hose whereby the stripped end of the hose can be telescopically inserted in the socket of the coupling without turning and subsequently expanded and clamped against the convexedly curved surface of the nipple, a part of said inner chamber portion and a part of said outer chamber portion having a series of gripping ribs adjacent the point of tangency, the remaining parts of said inner and outer chamber portions being smooth, the gripping ribs having a maximum depth approximately equal to the thickness of the reenforcing material and of gradually decreasing depth in the direction of both of said smooth parts and laying opposite the smooth outer portion of the nipple whereby the hose will be gripped with maximum compression in the region of the gripping ribs, and the taper of the nipple extending opposite the inner smooth part and all of the gripping ribs for clamping the hose end thereagainst.

References Cited in the file of this patent

UNITED STATES PATENTS

| Number | Name | Date |
|---|---|---|
| 2,278,239 | Butler | Mar. 31, 1942 |
| 2,371,971 | Main et al. | Mar. 20, 1945 |
| 2,441,718 | Parker | May 18, 1948 |
| 2,463,293 | Mentel | Mar. 1, 1949 |
| 2,476,480 | Burckle | July 19, 1949 |
| 2,485,975 | Main | Oct. 25, 1949 |

FOREIGN PATENTS

| Number | Country | Date |
|---|---|---|
| 115,489 | Australia | June 6, 1941 |